CENTRAL OFFICE MASSIVE MEMORY RECORDING SYSTEM

Filed Jan. 5, 1959 10 Sheets-Sheet 1

INVENTOR.
Edward Rogal
BY
Morse & Altman
ATTORNEYS

INVENTOR.
Edward Rogal
BY
Morse & Altman
ATTORNEYS

CENTRAL OFFICE MASSIVE MEMORY RECORDING SYSTEM

Filed Jan. 5, 1959

10 Sheets-Sheet 3

INVENTOR.
Edward Rogal
BY
Morse & Altman
ATTORNEYS

CENTRAL OFFICE MASSIVE MEMORY RECORDING SYSTEM

Filed Jan. 5, 1959 10 Sheets-Sheet 4

INVENTOR.
Edward Rogal
BY
Morse & Altman
ATTORNEYS

CENTRAL OFFICE MASSIVE MEMORY RECORDING SYSTEM

Filed Jan. 5, 1959 10 Sheets-Sheet 5

INVENTOR
Edward Rogal
BY Morse & Altman
ATTORNEYS

INVENTOR.
Edward Rogal
BY Morse & Altman
ATTORNEYS

INVENTOR
Edward Rogal
BY
Morse & Altman
ATTORNEYS

INVENTOR
Edward Rogal
BY
Morse & Altman
ATTORNEYS

INVENTOR.
Edward Rogal
BY
Morse & Altman
ATTORNEYS

Feb. 11, 1964 E. ROGAL 3,121,159

CENTRAL OFFICE MASSIVE MEMORY RECORDING SYSTEM

Filed Jan. 5, 1959 10 Sheets-Sheet 10

INVENTOR
Edward Rogal
BY
Morse & Altman
ATTORNEYS 3,121,159
Patented Feb. 11, 1964

3,121,159

CENTRAL OFFICE MASSIVE MEMORY RECORDING SYSTEM

Edward Rogal, North Scituate, Mass., assignor to Universal Controls, Inc., New York, N.Y., a corporation of Maryland Filed Jan. 5, 1959, Ser. No. 784,913
12 Claims. (Cl. 235—61.6)

The present invention relates to business equipment and, more paritcularly, to a novel system for comprehensively recording accounting and operating data with hitherto unequaled speed and accuracy.

The primary object of the present invention is to provide a novel remotely controlled system that enters data transmitted from the site (e.g. sales counter, purchasing office, receiving platform, refund desk, credit department, etc.) of a commercial transaction, at the very time of its consummation, in any and all pertinent accounting and operating (statistical records, which then may be without the intervention of human delay. Generally, this system comprises a plurality of transmitters for transmitting data from a plurality of transaction sites, a plurality of memories for selectively receiving records representing accounting multiple entries related to the transaction data in response to the signals, and a director for transmitting signals from appropriate source registers to the multiplicity of memories designated by the signals. Each transmitter produces a transaction slip or other printed and/or coded source document (e.g. sales slip, credit slip, invoice, etc.) verified for acceptability and accuracy at the time of the consummation of the transaction. The director includes switching for locating a source register at which a transaction is in process, for temporarily storing a record in response to signals representing information relating to this transaction, for locating all memories designated by these signals, for transmitting signals representing the temporarily stored record to all memories so designated and thereafter for disconnecting the source register from the remainder of the system. The memories represent multiple accounting journals and ledgers. These memories receive from the directors signals which first have been verified for acceptability by reference to a verifying record representing a watch list. Signals from these memories are compared at the time of each transaction to ensure a balance representing a continuing audit.

Other objects of the present invention will in part be obvious and will in part appear hereinafter.

The invention accordingly comprises the apparatus possessing the construction, combination of elements and arrangement of parts, which are exemplified in the following detailed disclosure, and the scope of which will be indicated in the claims.

For a fuller understanding of the nature and object of the invention, reference should be had to the following detailed description taken in connection with the accompanying drawings wherein:

FIGURE 1 is a general schematic diagram of an illustrative automatic accounting and operating system embodying the present invention;

FIG. 1*a* is a schematic diagram of auxiliary components that may be associated with the system of FIG. 1;

Figure 9:
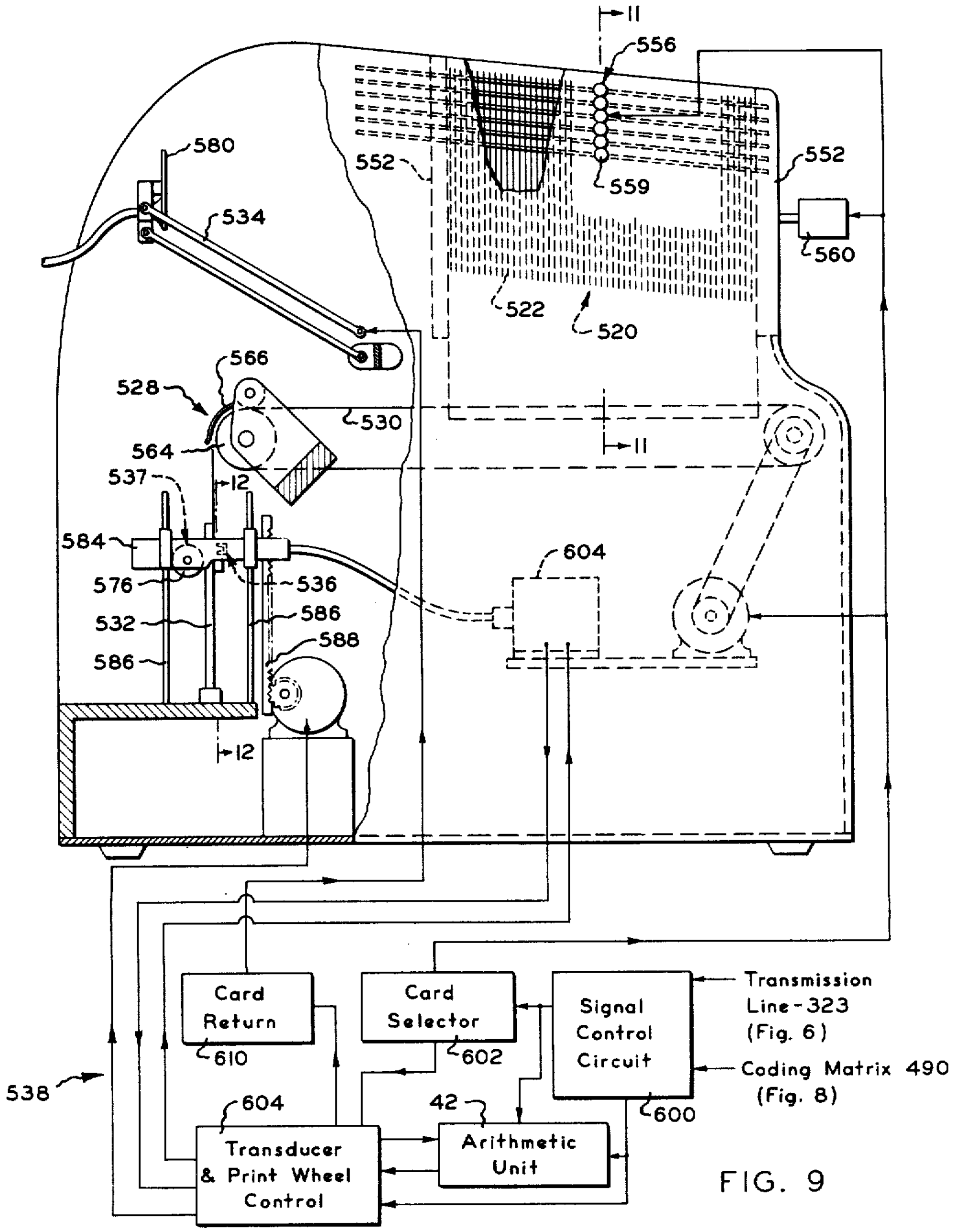
FIG. 9 illustrates an exemplary memory of the system of FIG. 1, partly in fragmentary mechanical elevation and partly in electrical block diagram.
Figure 10:
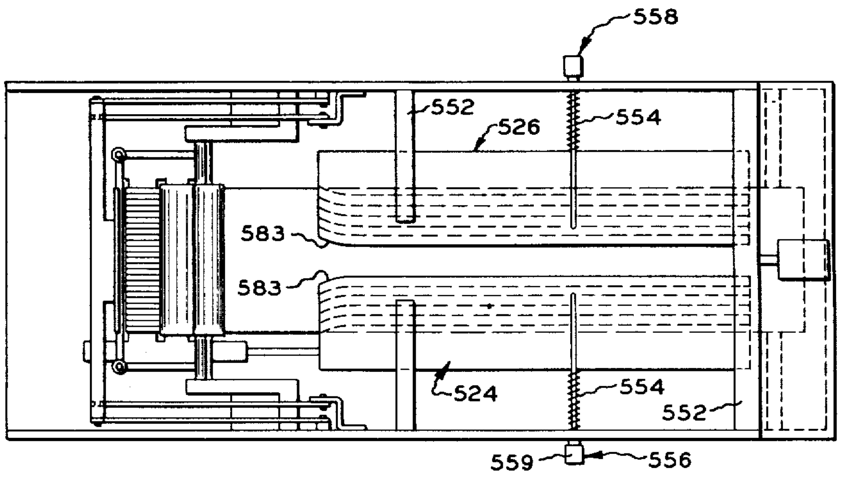
FIG. 10 is a top plan view of the memory of FIG. 9.
Figure 12:
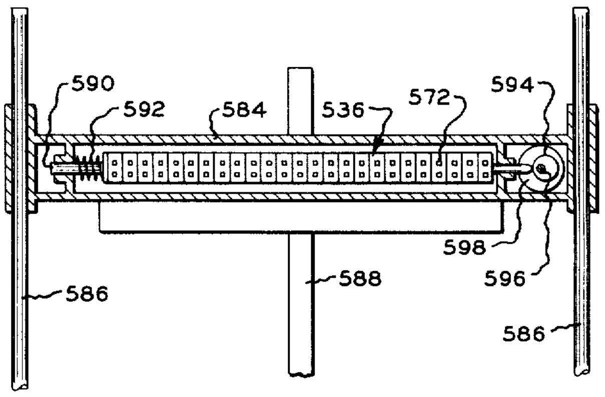
Figure 11:
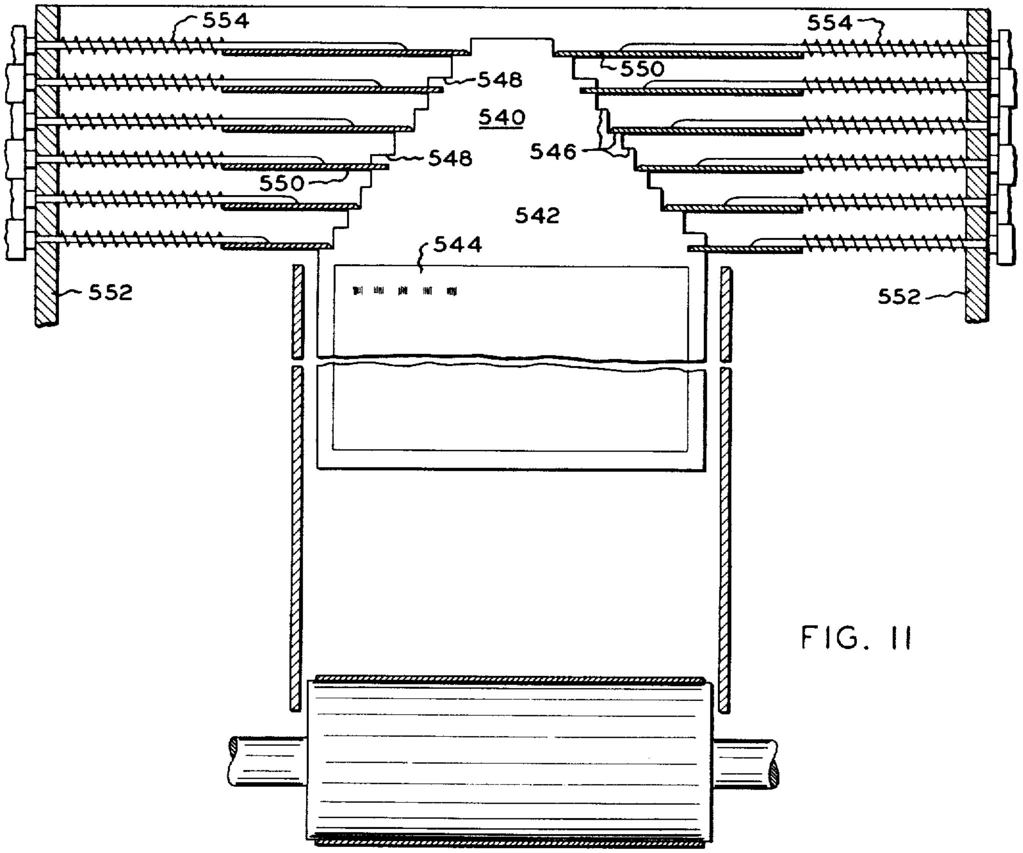
FIG. 11 is a sectional view of the memory of FIG. 9, taken substantially along the line 11—11.
Figure 11A:
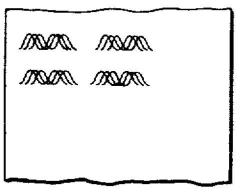
Figure 11B:
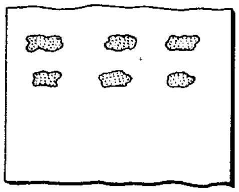
Figure 11C:
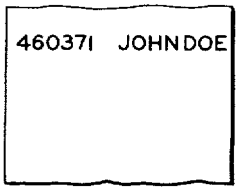

FIGS. 11*a*, 11*b* and 11*c* are alternative fragments of the memory of FIG. 9; and FIG. 12 is a sectional view of the memory of FIG. 9, taken substantially along the line 12—12.

Figure 1:
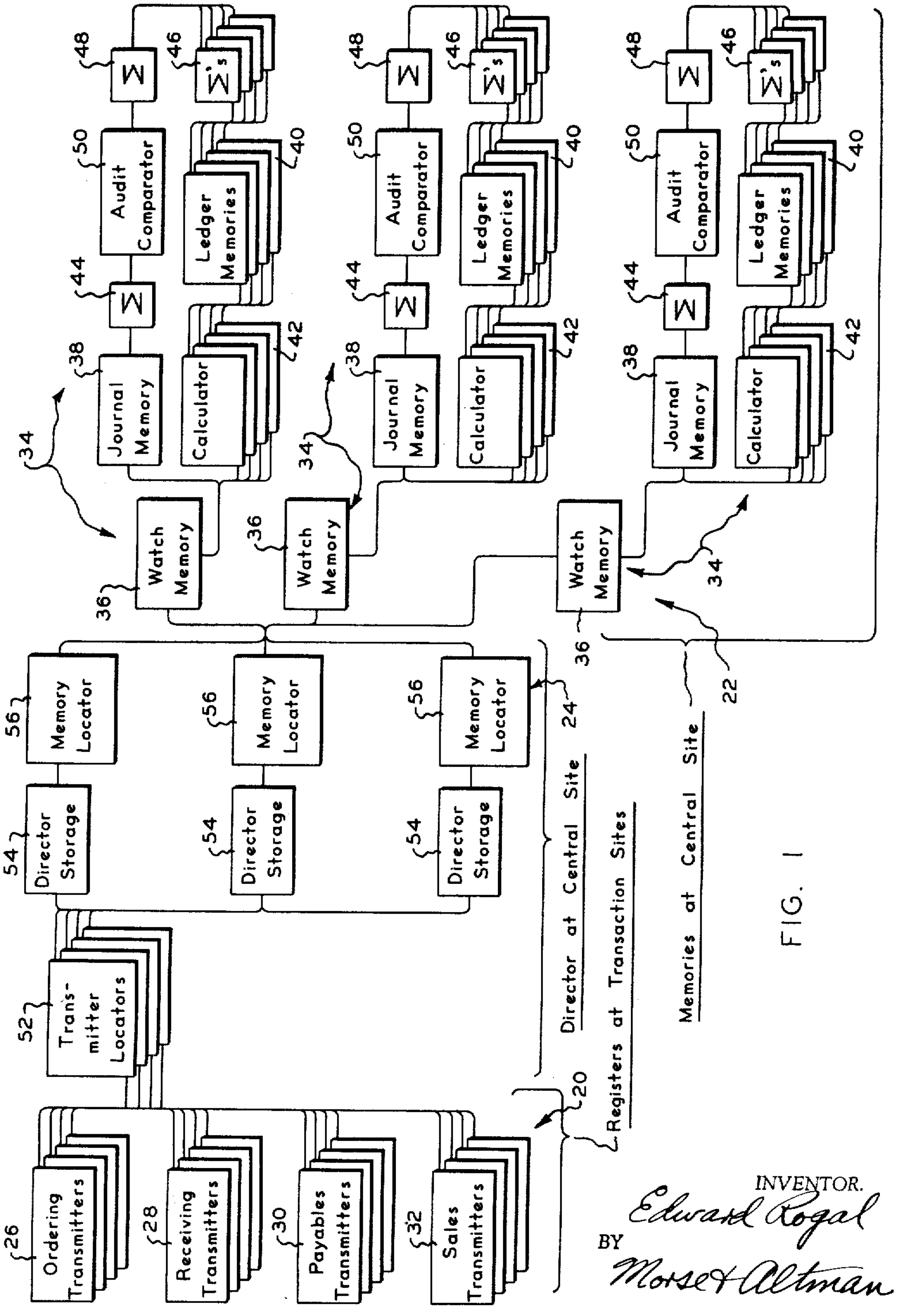

*The Block Diagram of FIG. 1*

As shown in FIG. 1 by way of example, the illustrated embodiment of the present invention is described herein in reference to a department store accounting and operating system comprising a plurality of transmitters 20 for transmitting signals representing transaction data from a plurality of transaction sites, an arrangement 22 of memories for selectively receiving records representing accounting multiple entries related to the transaction data in response to the signals, and a director 24 for transmitting signals from appropriate transmitters to the multiplicity of memories designated by the signals. Transmitters 20 are located throughout the many areas and rooms of the department store and/or department store branches. Memories 22 and director 24 are located at one or a few central locations in the department store, one or more of its branches or elsewhere.

Transmitters 20 include: a plurality of ordering transmitters 26 for transmitting transaction data from the various department store purchasing offices, etc. and for producing corresponding printed orders, etc.; a plurality of receiving transmitters 28 for transmitting transaction data from the various department store receiving platforms, etc. and for producing corresponding routing labels, coded and uncoded tags, etc.; a plurality of payables transmitters 30 for transmitting transaction data from the various department store disbursing offices, etc. and for producing corresponding checks, drafts, etc.; and a plurality of customer transmitters 32 for transmitting all types of customer transaction data from the various department store customer transaction counters and for producing corresponding sales slips, payment on account slips, etc.

Arrangement 22 includes one or more composite memories 34 each given composite memory: including a watch memory 36 to which incoming signals are referred in order to determine the acceptability to management of the transactions they represent (e.g. credit approval); a journal memory 38 which receives a sequence of records of all transactions represented by the sequence of signals transmitted to the given composite memory 34; a plurality of ledger memories 40 of which certain ones receive selected records of transactions represented by certain of the signals transmitted to the given composite memory; a plurality of arithmetic calculators 42, each of which responds to a selected signal to the given composite memory 34 and to a signal representing a corresponding record of a particular ledger memory 40; a totalizer 44 for maintaining a running total of the transaction data, i.e. money amounts or the like represented by the signals received by journal memory 38; a plurality of totalizers 46 for maintaining selected running totals of the transaction data, i.e. money amounts or the like represented by signals received by selected ledger memories 40; a totalizer 48 for maintaining a running total of the transaction data, i.e. money amounts or the like recorded by totalizers 46; and a comparator 50 for issuing a warning signal in the event of an unbalance at any given time between the running total maintained by totalizer 44 and the running total maintained by totalizer 48.

Director 24 includes: electromagnetic switching units 52 for locating an operating transmitter at which a transaction is in process, electromagnetic converting units 54 for temporarily storing a record in response to signals representing information relating to this transaction, and electromagnetic switching units 56 for locating all memories designated by the temporarily stored signals.

Figures 1A, 8:
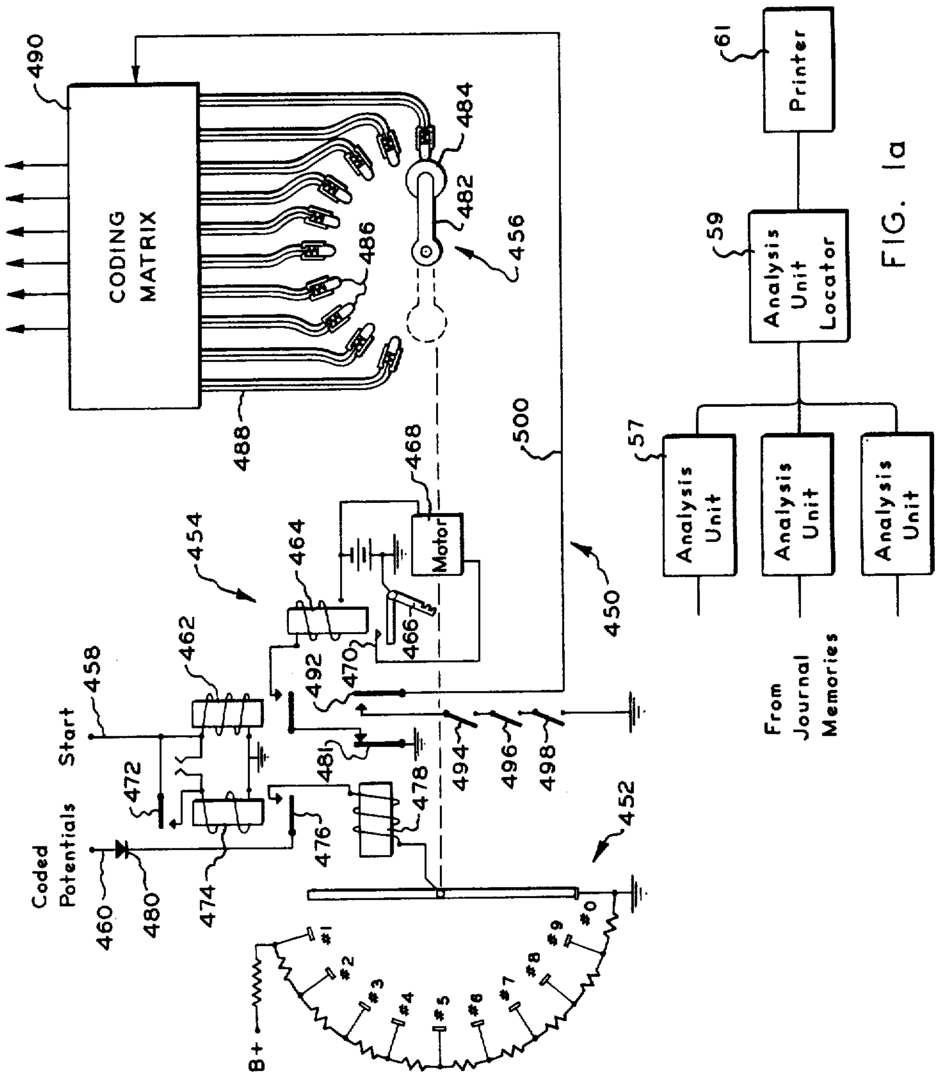
FIG. 8 illustrates further details of the memory locator of FIG. 7.

As shown in FIG. 1*a*, the data recorded in the memories of the illustrated system may be analyzed by auxiliary components including analysis units 57 capable of receiving selected data from the journal memories, a locator 59 for locating any analysis unit desired and a printer 61 for recording the analysis results.

In the present system, certain of the signals representing information being transferred are in the form of selected combinations of frequency cords or tones. It is apparent that ten digits may be represented as ten different combinations of two out of six frequencies. In other words, any individual digit from 0 to 9 of a first decimal column or order of a multi-digit number or field may be represented by a code of two out of six frequencies, any individual digit from 0 to 9 of a second decimal column or order may be represented by a code of two out of six other frequencies, etc. The two out of six frequencies presenting the first decimal order, the two out of six frequencies representing the second decimal order, etc. all may be combined for transmission at one time while retaining their identity for separation by suitable discriminating circuits. It has been found that a six digit field preferably is represented by twelve out of thirty six frequencies.

The illustrated system will be described in reference to a plurality of fields or specific groups of digits, which fields are intended to represent all relevant information of a given transaction. Certain fields determine particular memories to which information is to be transmitted and certain other fields represent mathematical entries involved in the transaction. By way of example below, the selection of a particular memory represented by a particular field will be illustrated in detail. This selection is similar to other selections of other memories represented by other fields occurring simultaneously.

Figure 2:
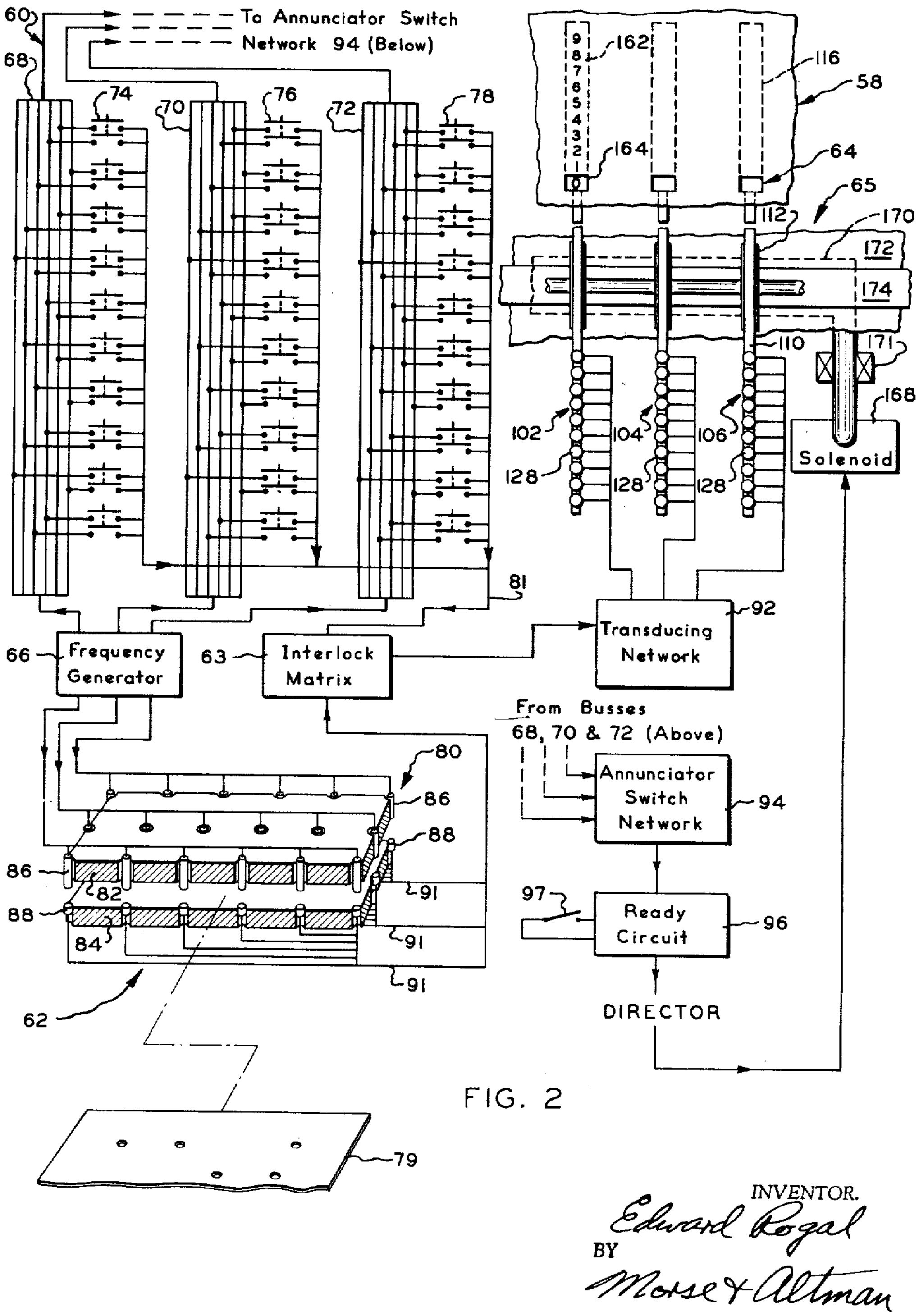
FIG. 2 illustrates details, fragmentary for clarity, of the circuitry and mechanism of a transmitter of the system of FIG. 2.
Figures 3, 4:
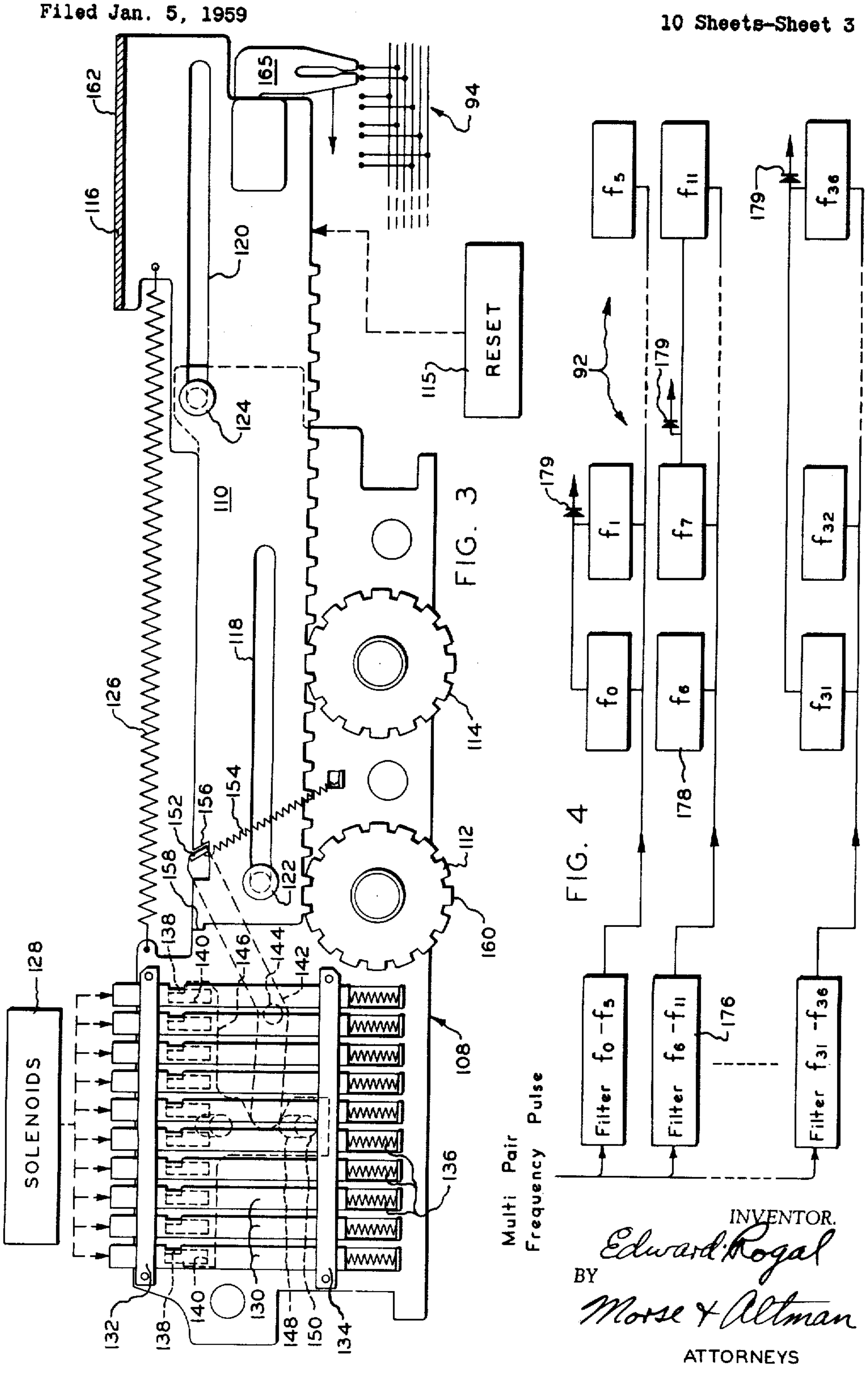
FIG. 3 is a side view of a component of the register of FIG. 2.
FIG. 4 is a block diagram of a component of the transmitter of FIG. 2.

*The Transmitters as Illustrated in FIGS. 2, 3 and 4*

Each of transmitters 26, 28, 30 and 32 includes generally: a housing, a fragment of which is designated 58 at the upper right of FIG. 2; a keyset component, a fragment of which is designated 60 at the upper left of FIG. 2; a coded tag or tab sensing component, a fragment of which is shown at 62; an annunciating component, a fragment of which is designated 64 underneath fragment 58 of the housing; and a source document component, a fragment of which is designated 65 at the upper right of FIG. 2 in association with fragment 64 of the annunciating component. Tag or tab sensing component 62, although shown singly, in practice is associated with a plurality of similar tag or tab sensing components that cooperate to sense simultaneously the tags or tabs of a customer, a sales clerk, a sales tag, etc. Keyset component 60 and sensing component 62 are interlocked by a matrix component 63 which operates to prevent the operation of keyset component 60 when tag or tab sensing component 62 is in operation unless an operator intentionally interjects information from keyset 60. Annunciating component 64 enables an operator to observe the data setup in the transmitter before transmission. Source document component 64 produces a source record of a desired portion of the transmitted data upon receipt of a signal evidencing the acceptance and conclusion of the transaction. The signals sent by the illustrated transmitter are frequency signals containing digital information in the form of simultaneous pairs of discrete cords, each pair selected from a distinct set of six.

For clarity only three of the plurality of channels of the illustrated transmitter are shown for producing pairs of discrete cords. These pairs of discrete cords are selected from three groups of six frequencies each supplied by a suitable frequency generator 66 to each of three busses 68, 70 and 72. Three columns of keysets 74, 76 and 78 are associated with three input busses 68, 70 and 72, respectively. Each keyset of each column operates a switch, which when actuated applies to an output bus 81, a unique combination of two out of six frequencies. Frequency generator 66 also feeds its frequencies to a coded tag or tab sensing mechanism 80, which constitutes one of plurality 62. Sensing mechanism 80 includes a pair of relatively reciprocable blocks 82 and 84 that respectively are provided with rows of spring pressed, axially movable, electrical input pins 86 and rows of stationary electrical contacts 88 registered therewith. Pins 86 are fed with frequencies from busses similar to busses 68, 70 and 72. Interlock matrix 63 establishes whether keyset component 60, sensing mechanism 80 or portions of both control the signals transmitted. Matrix component 63, for example, make break switches that prevent the transmission of frequencies through any keysets 75, 76 and 78 that have been actuated, unless a portion of the information or its entirety is desired. Thus, if a coded tag or tab 79 is contiguously interposed between blocks 82 and 84, keysets 74, 76 and 78 cannot be actuated unless permitted by operation of interlock matrix 63, which then permits the transmission of keyset selected frequencies. On the other hand, if keysets 74, 76 and 78 have been actuated, interlock 63 may operate to transpose the sequence of certain digits set up by sensing mechanism 80 and keyset component 60. Furthermore, the output of sensing component 62 can be utilized to actuate interlock matrix 63.

The signals through interlock matrix 63 from output busses 81 and 91 are applied to a transducing network 92, which sets up annunciating component 64, source document component 65 and an associated switch network 94 (details of which are shown in FIG. 3). In the manner now to be described, annunciating component 64 serves to permit the operator to observe visual indicia of data that has been set up. After the operator has checked the visual indicia for accuracy, he causes a ready signal to appear on a ready circuit 96. This ready signal appears when a source record holder (not shown) is closed so as to operate a suitable interlock circuit 97. For purposes of clarity, it now should be stated that at this point, in a manner to be described later, signals representing the transaction are transmitted and the acceptability of the transaction is determined. If the transaction is found acceptable, the production of a source record and the release of the transmitter occurs to permit the transmitter to be set up for a new transaction.

Annunciating component 64 includes a plurality of annunciating mechanisms of which three are shown at 102, 104, and 106 in correspondence with busses 68, 70 and 72, respectively. As shown in FIG. 3, each annunciating mechanism includes a stationary mounting plate 108 and, mounted thereupon, a reciprocable slide rack 110, a rotatable print wheel 112 that is driven by slide rack 220, an indicator plate 116 that is carried by slide rack 110, and a suitable reset solenoid assembly 115. Rotatable with print wheel 112 is an auxiliary print wheel 114 for printing in a second position when desirable. The longitudinal position of slide rack 110 and, consequently, the rotational position of print wheels 112 and 114 and the longitudinal position of indicator plate 116 are controlled as follows.

Slide rack 110 is provided with a pair of parallel longitudinal slots 118 and 120 through which a pair of guide pins 122 and 124 extend from mounting plate 108.

Normally, slide rack 110 is returned to the illustrated extreme position (with pins 122 and 124 in abutment against the inner ends of slots 118 and 120) by reset assembly 115 against the reverse bias of a spring 126. Each slide rack 110 is associated with ten solenoids 128 that control the operation of slide rack 110. In response to an appropriate direct current output from transducing network 92, one of ten solenoids 128 is energized. Solenoids 128 are operatively connected to slide links 130, which are vertically reciprocable under the constraint of a pair of guides 132 and 134. Slide links 130 normally are urged into the uppermost positions by compression springs 136, which are operatively disposed between slide links 130 and mounting plate 108. Slide links 130 are provided with rearwardly projecting lugs 138 which project through openings 140 in mounting plate 108. Mounted on the rearward face of mounting plate 108 are a crank latch 142, which is pivoted at 144, and a latch release slide 146, which is vertically reciprocable under the constraint of slots 148 in slide 146 and pins 150 projecting from mounting plate 108. It will be observed that one end of crank latch 142 is engaged by release slide 146 and the other end is provided with a lug 152 which is biased by a spring 154 into a notch 156 in slide rack 110. The arrangement is such that when one of the solenoids 128 is actuated, the lug 138 of one of slide links 130 engages latch release slide 146. In consequence, latch release slide 146 is moved downwardly, crank latch 142 is pivoted so that lug 152 is withdrawn from notch 156 and slide rack 110 is directed to the left until its advance edge 158 abuts against the particular lug 138 that is engaging release slide 146. All other lugs 138 are spaced from the path of travel of advance edge 158.

In this position, slide rack 110 causes print wheels 112 and 114 to rotate to a position at which a particular increment 160 bearing one or more numerals or other characters is in printing position and causes indicator plate 116 to advance to a position at which a corresponding increment 162 bearing corresponding numerals or other characters underlies a window 164 in housing 58 (FIG. 2).

As shown, slide rack 110 carries an insulated contact 165 which constitutes part of switch network 94. Switch network 94 applies a selected pair of frequencies from an associated frequency bus (shown in FIG. 2 at 68, 70 and 72) to ready circuit 96. In this way, the selected indicia 162 visible through window 164 is directly interconnected with the selected pair of frequencies from the associated frequency bus. As indicated above, after the acceptability of the transaction has been determined favorably, a signal returned to the transmitter to cause the production of a source document. The source document, shown at 172, is produced as follows. The return signal causes a solenoid 168 to operate a printing platen 170 that is pivoted at 171. Document 172 of selected blank form, which is positioned in a drawer or other holder between printing platen 170 and an inked ribbon 174, receives an impression from printing wheels 112 and 114 when solenoid 168 is energized. This document after being printed is removed from the register by the operator.

A detail diagram of transducing network in FIG. 4. In the illustrated system as indicated above, one digit of a six digit field is represented by a selection of two out of six frequencies. The frequencies of all of the groups are different. A particular pair of frequencies is applied to a particular one of solenoids 128 in the following way. All pairs of frequencies produced are applied to all of a plurality of broad band filters 176, each of which passes only one of the groups of six frequencies. The selected pair of frequencies from any broad band filter 176 are applied to ten narrow band filters 178. Two of narrow band filters 178 will pass the two frequencies of the selected pair. The two outputs of these two narrow band filters 178 are capable of passing two frequencies, which when rectified by suitable rectifiers 179, energize a particular solenoid 128. The arrangement is such that the output of only one of the narrow band filters 178 will not energize a particular solenoid 128.

Figure 5:
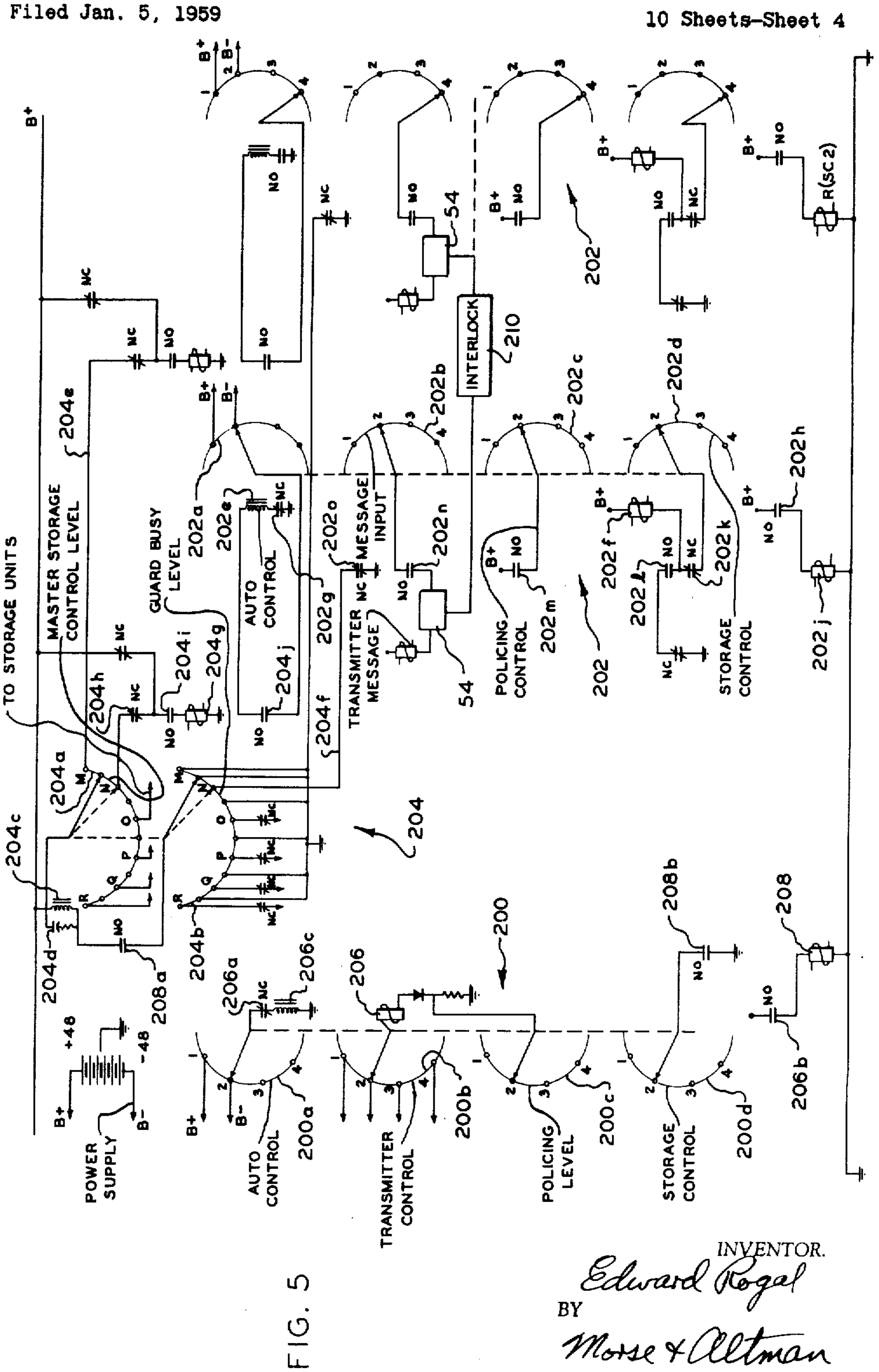
FIG. 5 illustrates details of a transmitter locator of the director of FIG. 1.

*Allocation of a Director Storage to a Ready Circuit Transmitter—FIG. 5*

Transmitter locator 52, which as indicated in FIG. 1 is designed to allocate a given number of director storage units 54 to a given number of transmitters 20, is shown in detail by way of example in FIG. 5. Generally, the circuit of FIG. 5 detects a transmitter with a transaction signal ready to be sent, determines whether an associated director storage unit 54 is available, connects the transmitter so found to the available director storage unit so located, after completing the connection of other transmitters that are ready to send to other available director storage units, and breaks the connection between any transmitter and any director storage unit as soon as the message has been accepted and recorded.

The circuit includes: a multilevel switch 200 in association with all transmitters 20; a plurality of multilevel switches 202, one switch 202 being in association with one director storage 54; and a multilevel switch 204 for master controlling the operation of switches 200 and 202. Transmitter switch 200 includes an auto control level 200*a*, a transmitting control level 200*b*, a policing level 200*c* and a storage level 200*d*. Each storage switch 200 includes an auto control level 202*a*, a transmitter message level 202*b*, a policing level 202*c*, and a storage control level 202*d*. All policing levels on transmitter and storage switches 200 and 202 are multipled. All storage control levels on transmitting and storage switches 200 and 202 are multipled. All message levels 202*b* on storage switches 202 only are multipled. The message leads of various transmitters are connected to the respective pole points of message levels 202*b* of storage switches 202. Master control switch 204 includes a master storage control level 204*a* and a guard busy level 204*b*. All of the foregoing switches operate continuously except when connecting a given located transmitter 20 to a given located director storage 54.

In the following description of the operation of the circuit of FIG. 5, it will be convenient to assume that the ready transmitter 20 is connected to pole point 2 of transmitter control level 202*b* and that a message has been set up in this transmitter 20. Accordingly, a ready signal, for example 48 v. D.C., is transmitted to pole point 2 of transmitter control level 200*b*. The connections on auto control level 200*a* are such that transmitter switch 200 operates continuously until the scanner of transmitter control level 200*b* contacts a pole point marked with the ready signal, i.e. 48 v. D.C. In consequence, a relay 206 associated with the scanner transmitter control level 200*b* is energized in order to actuate a normally closed switch 206*a*, associated with the scanner of auto control level 200*a*, and a normally open switch 206*b*, associated with the scanner of storage control level 200*d*. When switch 206*a* opens it stops the drive mechanism 206*c* of transmitter switch 200. When switch 206*b* closes, it energizes a relay 208 in order to close a normally open switch 208*b* associated with the scanner of storage control level 200*d*.

When switch 208*b* closes, it causes ground to be applied to the selected pole point of storage control level 200*d*. Since this selected pole point is multipled to all corresponding pole points of other storage levels 202*d*, all of these corresponding pole points are grounded.

When switch 208*a* closes, it energizes the drive mechanism 204*c* of master control switch 204 and charges a capacitor 204*d* associated with drive mechanism 204*c*. It will be observed that now B+ is applied through lead 204*e* to pole point M of master storage control level 204*a* and that pole point N of guard busy level 204*b* is grounded through lead 204*f*. When the scanner of guard busy level 204*b* steps to pole point N, it signifies that there is an available storage switch 202 at the N position. A relay 204g now is energized and locks itself in this condition through a normally closed make-then-break switch 204h and a normally open make-then-break switch 204i. Now a normally open switch 204j, which is connected to the scanner of auto control level 202a of the available storage switch 202, closes.

In consequence, a motor drive 202e starts to operate. When the scanner of storage control level 202d finds pole point 2 grounded, it energizes relay 202f. Relay 202f actuates a normally closed switch 202g and a normally open switch 202h. The opening of switch 202g causes the scanners of storage switch 202 to stop at pole points 2 by de-energizing motor drive 202e. The closing of switch 202h energizes a relay 202j, which actuates make-then-break switches 202k and 202l in order to de-energize relay 202f, to disconnect the scanner of storage control level 202d and to actuate a normally open switch 202m. Swith 202m applies B+ to pole point 2 of policing control level 202c (which is multipled to all policing control levels of transmitter and storage switches 200 and 202). Also normally open switch 202n is actuated in order to connect a particular director storage 54 to pole point 2 of transmitter message level 202b, which is multipled to the message levels of the other storage switches 202.

In response to the operation of relay 202j, a switch 202c opens, removing ground from motor drive 204c, which thereby is caused to continue scanning until it contacts a permanently grounded point between N and O on guard busy level 204b. At this point, relay 206 has been de-energized because B+ has been applied to the circuit of policing level 200c from switch 202m. Switch 206b thus is deactuated, relay 208 is de-energized and switch 208a is deactuated. Thus the original state is restored and motor drive 206c continues to scan the pole points of switch 200 until another message from a different transmitter arrives at transmitter control level 200b. Capacitor 204d discharges through the master storage control and relay 204g. This causes the scanner on guard busy level 204b to move to a grounded position between pole points N and O.

It is to be noted that capacitor 204d discharges through the master storage control and relay 204g. This causes the scanner on guard busy level 204b to move to a grounded position between pole points N and O. When the message has been transmitted into storage 54, the transmitter sends a reset signal thereto in order to permit reception of another message.

The various director storage units 54 are selected at random by the above described circuit. Thus under appropriate circumstances information from a transmitter 20 selected by a ready circuit signal is transmitted to designated memories through a storage unit 54 selected at random. Inasmuch as it is necessary to transmit information from a particular transmitter to designated memories through a randomly selected storage unit 54, the switching, which, as will now be described, constitutes storage units 54, is multipled in conjunction with suitable interlocks 210 that are capable of selecting given memories under the control of signals from any of transmitters 20.

Figure 6:
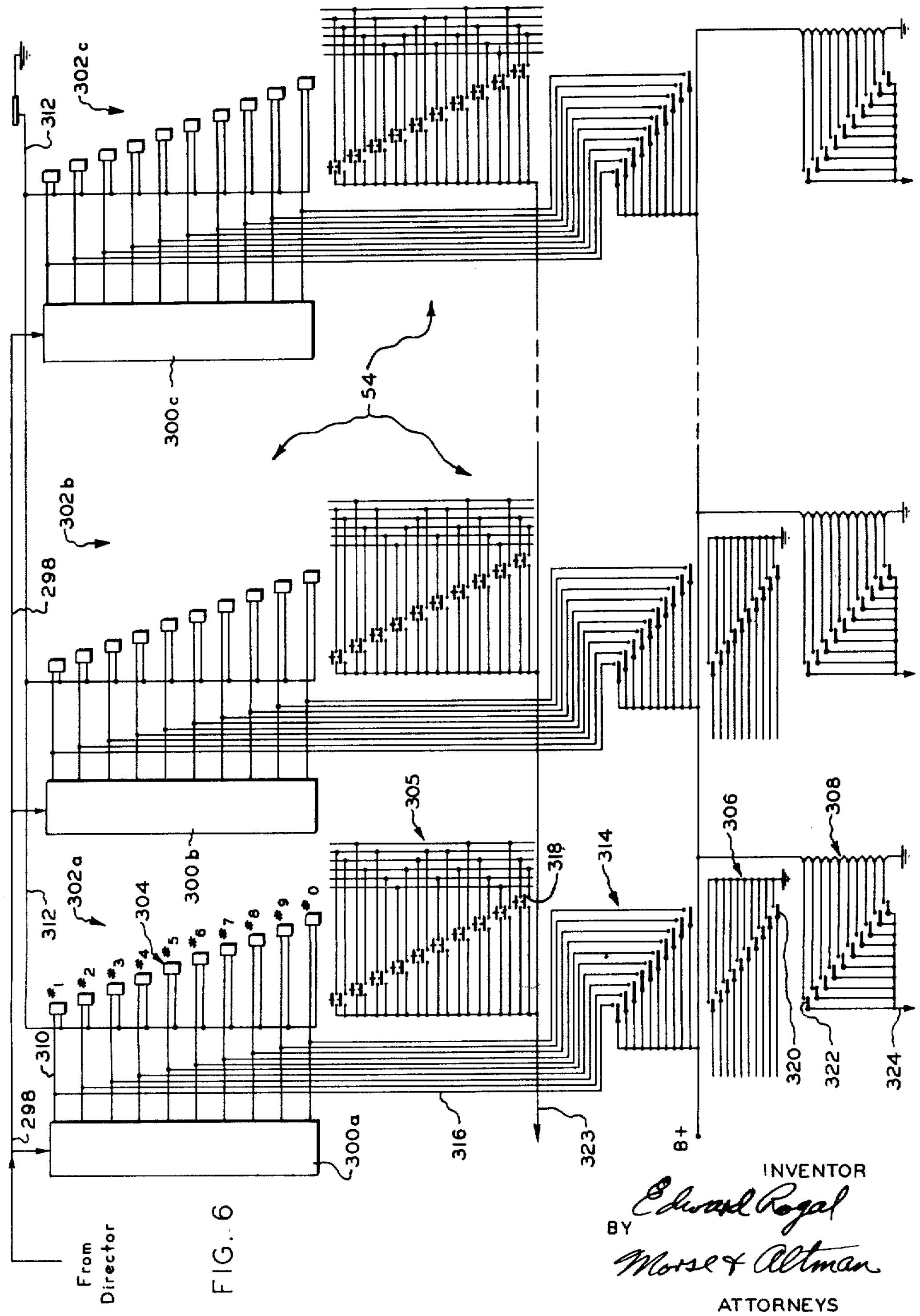
FIG. 6 illustrates details of a temporary storage of the director of FIG. 1.

*Director Storage—FIG. 6*

As indicated above, director 24 includes storage units 54, each in the form of a bank of switches for temporarily storing a record in response to signals from a ready circuit transmitter 20. The manner by which a transmitter 20 and a storage unit 54 are located and their connection is established has been described in reference to FIG. 5. When the transmitter 20 and the storage unit 54 are so connected, a cord of pairs of frequencies is transmitted. One such storage unit 54 is shown in FIG. 6. This storage unit includes column sections representing the orders of the field to be stored temporarily. The first two and the last one of these sections are designated generally at 302a, 302b and 302c. The incoming cord is applied through a lead 298 to a discriminating system 300a, 300b and 300c, which may be of the same broad band and narrow band type as is shown in FIG. 4.

Each column section includes a holding switch section 304 for locking up incoming signals, a frequency selecting section 305 for determining frequencies analagous to those received, a marked lead section 306 by which a selector switch may determine which digits are indicated so that routes for frequencies so determined may be established to particular ledger memories 40, and a potential coding section 308 which transmits coded potentials, in correspondence with the determined frequencies, by which particular memories may be selected. Although not all of the illustrated column sections require a marked lead section 306 and a potential coding section 308, they are shown as including these sections for the purpose of generality.

The operation of column section 302a now will be described by way of example, it being understood that the other column sections operate similarly. The incoming cord from line 298 is discriminated and transduced at 300a so as to energize one of the ten relays 304 #1, #2, #3, #4, #5, #6, #7, #8, #9 and #10, the incoming direct current signal being transmitted through one of ten leads 310, through the coil of one of the solenoids and thence through a ground return lead 312. The particular switch 304 actuates a particular one of ten associated hold switches 314, which establishes a path from B+ through one of ten leads 316 and its associated lead 310 to lead 312 and ground. The energized solenoid 304 actuates a corresponding one of ten switches 318 of frequency selecting section 305, a corresponding one of ten switches 320 of marked lead section 306 and a corresponding one of ten switches 322 of potential coding section 308. The selected frequencies now are in condition for transmission from storage 54 through an output line 323.

Before transmission can occur, however, the cord appearing at the output line 323, is referred to the watch memory 36 (FIG. 1) associated with the particular composite memory 34 desired. Watch memory includes a simple signal comparison circuit for determining whether or not the cord appearing on lead 323 is the same as one of the cords of a list of cords generated by the watch memory. This comparison, for example, may determine whether or not a particular credit transaction involving a particular customer is acceptable. If the comparison indicates that the cord from lead 323 is different from any cord generated by the watch memory, the transaction is acceptable and a signal is transmitted from the watch memory to actuate solenoid 168 of transmitter 20 (FIG. 1) and to record the information from storage unit 54 in the remainder of the system.

The cord appearing on output line 323 also is directed to a journal memory 38, which records, both in coded and printed form, all signals received.

The cords appearing on the leads of marked lead section 306 and potential coding section 308 are examined by a locating circuit for the purpose of establishing a path between lead 323 and particular portions of particular ledger memories 40 in a manner now to be described.

Figure 7:
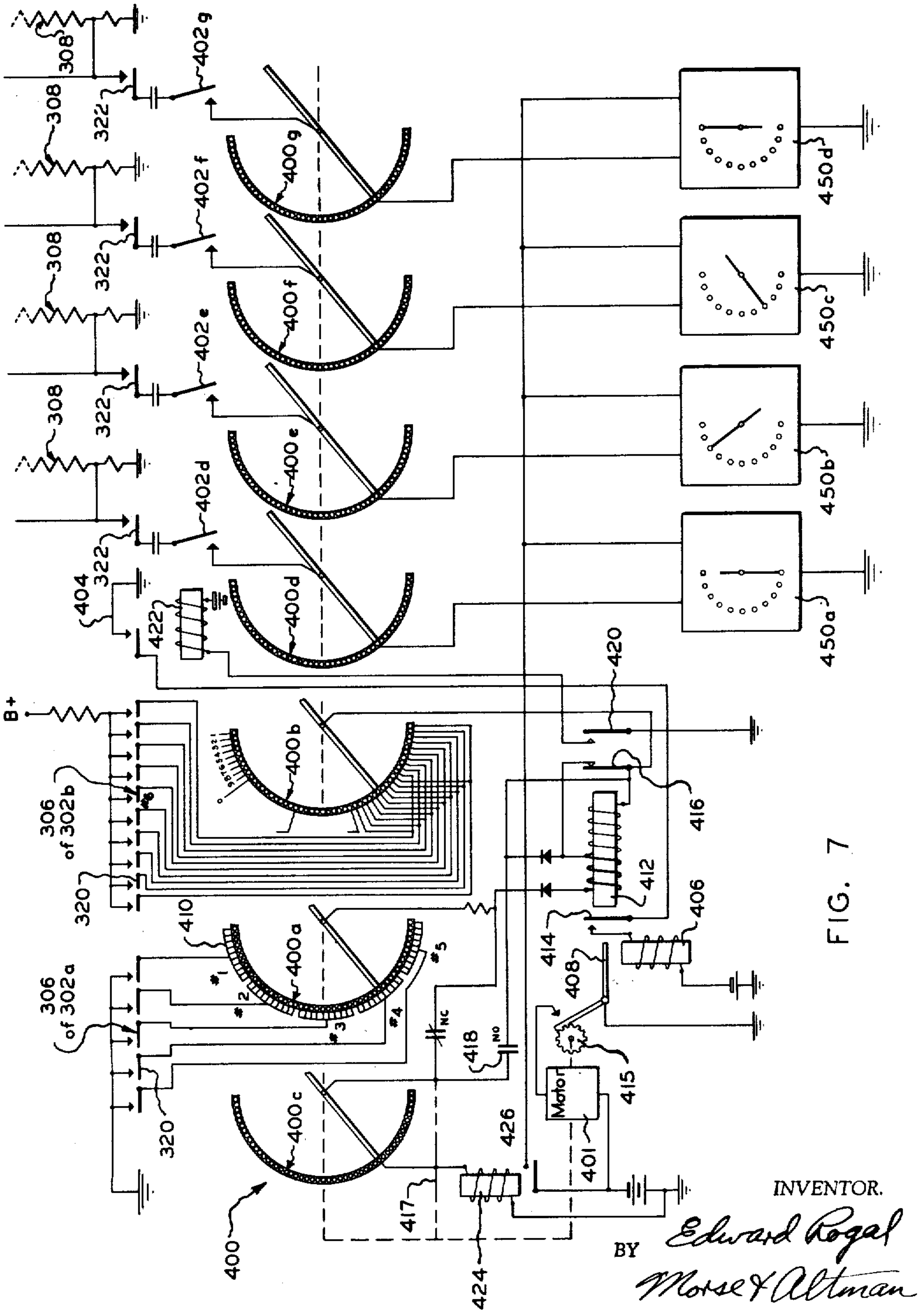
FIG. 7 illustrates details of a memory locator of the director of FIG. 1.

*Memory Locator—FIG. 7*

As will be explained below, any composite memory 34 of the illustrated embodiment comprises, for example, a plurality of memories of different categories, each of which includes a group of one thousand magnetic cards. One of these categories is described in connection with FIG. 1 as being a group of ledger memories 40. As will be described below in connection with FIGS. 9, 10, 11 and 12, each ledger memory 40 may be in the form of a holder of a stack of magnetic cards. The circuit of FIG. 7 is designed to select one of the holders from its group. The circuit of FIG. 8 is designed to select one of the cards from its stack. In order to aid in the explanation of the operation of the circuit of FIGS. 7 and 8, let it be assumed that a particular field being transmitted is "460 #371," which indicates that the transaction is to be recorded in ledger memory holder #46 and magnetic card #371. The circuit of FIG. 7 is designed to sense the energized leads of the marked lead sections 306 of column sections 302*a* and 302*b* and to sense the energized leads of the potential coding sections 308 of the third, fourth, fifth and sixth channels of storage unit 54.

Associated with the director storage unit occupied by the particular message under consideration is a motor driven switch 400 having a multiplicity of pole point sequences including a tens digit marking sequence 400*a*, and four auxiliary digit marking sequences 400*d, e, f, g*. The scanners associated with all of these sequences are ganged mechanically and driven by a motor 401. The operation of sequences 400*a, b, c* in selecting a particular ledger memory will be described below. While sequences 400*a, b, c,* are so operating, scanners of auxiliary digit marking sequences 400*d, e, f, g* are being marked with the information necessary for the selection of a particular magnetic card from the ledger memory so selected. This marking, in a manner to be described more fully below, takes the form of applying selected potentials from potential coding sections 308 of storage 54 (FIG. 7) respectively to normally open switches 402*d, e, f* and *g*, which are associated with the scanners of sequences 400*d, e, f, g*.

When storage unit 54 has received at least a certain part of the transmitted message, and has accumulated the first two digits (in this case "46," which may represent a customer's charge account number) a start switch 404 grounds the circuit of a latch solenoid 406. When solenoid 406 is energized, switch 408 is closed in order to energize motor 401 and to operate the scanners of the various sequences.

Sequence 400*a* has five groups of pole points 410 #1, #2, #3, #4, #5 occupying segments of equal length. Pole points 410 signify the first five digits of the tens order of the address. (The pole points signifying the remaining five digits are not shown.) With the aforementioned exemplary address, segment #4, is grounded by corresponding switch 320 of marked lead section 306 of storage 54 (FIG. 6). The scanner of sequence 400*a* is connected to one terminal of a test relay 412.

The pole points of sequence 400*b* are divided into five groups of ten pole points each. Analagous pole points of these groups are multipled and connected respectively to switches 320 of the marked lead section 306 of column section 302*b* (FIG. 6), where the units digit of address "46" is selected. Switch #6 of marked lead section 306 is at plus potential, in consequence of which five of the pole points of sequence 400*b* also are at plus potential. The scanner of switch 400*b* is connected to the other terminal of test relay 412.

When the scanner operates (in a counterclockwise direction), the blade of arc 400*a* will rotate to a grounded segment in position #4, whereby a terminal of relay 412 will be connected through switch 320 to ground. As the operation proceeds, the blade of arc 400*b* will rotate to a pole point at a position #6, which is one of the ten positions associated with position #4 of arc 400*a*. A positive potential exists at this position #6 so that current flows through a low resistance section (shown as a heavy coil) of the winding of relay 412 in such a way as to open a switch 414 and to deenergize latch relay 406. In consequence, latch 408 of latch relay 406 deenergizes motor 401 and meshes with a gear wheel 415. Since wheel 415 is keyed to the common shaft of the blades of the various arcs, the rotation of these blades stops. At this point the blades are locked on pole points of arcs 400*a* and 400*b* representing "46." Also test relay 412 opens a switch 416 so as to short out the high resistance section of winding 412 (shown as a light coil) and to insert the low resistance section of winding 412 into series between the blades of arcs 400*a* and 400*b*. Thus, relay 412, while drawing a negligibly small current, holds switch 414 open. It is now evident that relay 412 cannot stop rotation of the blades unless there is a coincidence of the potentials of arcs 400*a* and 400*b* at given positions of their blades.

Multipled interlock 210 associated with the various director storages 54, in the illustrated embodiment, comprises jumpers, one of which is shown at 417 which connect the pole points of control sequence 400*c* to analagous pole points of other like control sequences in the system. The scanner of sequence 400*c* is connected through a normally open switch 418 to a position between relay 412 and switch 416. When relay 412 operates, the potential at the scanner of sequence 400*c* decreases from almost full B+ to a relatively low value that is determined by the IR drop across the low resistance section of the winding of solenoid 412. Accordingly, this low potential is applied across the test relay associated with any other control arc so that all other multipled control sequences of the system are prevented from stopping at position #46. In consequence, the busy address is rendered inaccessible to all later testing and a ready director storage 54 seeking the busy address must continue operating until that address becomes free.

When test relay 412 operates it actuates a switch 420 in order to energize a time delay 422 that is in association with switches 402*d, e, f, g*. Thereby, coded potentials are applied from potential coding sections 308 of the associated column sections director storage 54 to associated potential decoders 450*a, b, c, d*. These decoders select a particular card from the ledger memory designated by sequences 400*a* and 400*b* in a manner to be described below when permitted by a time delay relay 424. Time delay relay 424 operates as follows to prevent the operation of decoders 450*a, b, c, d* until the scanners of pole point sequences 400*a* and 400*b* have come to rest. In position #46, the scanner of guard busy sequence 400*c* applies B+ to delay relay 424 through one of jumpers 417. As switch 400 is operating any such marked digit position will be applied to guard busy sequence 400*c*, applying B+ briefly to the jumpers and hence to time delay relay 424. However, this time delay relay is designed to operate only when its winding has remained energized for a considerably longer interval of time than permitted by the brief intervals of scanning. When the operation of the scanners is halted, relay 424 remains energized for a sufficiently long time to close its switch 426. In consequence decoders 450*a, b, c, d* are energized and proceeds to operate.

The construction of an exemplary decoder 450 is shown in FIG. 8 as including a motor driven switch 452, associated relays 454 and a mechanical setting unit 456, which is ganged for operation with the scanner of switch 452 in order to actuate the card selecting components to be described below.

Decoder 450 operates under the control of a start lead 458 and a potential lead 460, the latter being connected via one of pole point sequences 400*d, e, f, g* (FIG. 7) to an associated coding potential section 308 at a particular position in director storage unit 54. As indicated above, time delay relay 424 initiates the operation of all decoders. Time delay relay 424 operates to apply B+ across relay 462 and thereby to energize a motor relay 464. Associated with motor relay 464 is a latch 466, which normally prevents rotation of motor 468, and a normally open switch 470 in the power line supply of motor 468. When motor relay 464 is energized, latch 466 is deactuated in order to permit motor 468 to rotate and switch 470 is closed in order to cause motor 468 to rotate.

The scanner of switch 452 sequentially contacts pole points #1, #2, #3, #4, #5, #6, #7, #8, #9 and #0 along its sequence. These pole points are connected to the junctions of a series of voltage dividing resistors which supply the pole points with progressively decreasing potentials. These potentials, for example, may decrease in steps of 4 v. from 36 v. at point #1 to 0 v. at point #0. Operation of the scanner is such that the highest potential is sensed first. When the scanner has passed point #10 but before it contacts point #1, a cam (not shown) closes a switch 472 in order to energize relay 474. In consequence, switch 472 remains closed and a switch 476 connects coded potential lead 460 to one terminal of a test relay 478. The other terminal of test relay 478 is connected to the scanner of switch 452. As the scanner operates it first contacts point #1, which is at a potential of 36 v. Let it be assumed, for example, that a potential of 4 v. appears on coded potential line 460, representing the digit "1," it being understood that the potential alternatively may be any other one of ten values ranging from 4 v. to 40 v., representing the digits "1" to "0".

It will be observed that a circuit is completed from the pole point contacted by the scanner of switch 452, through the winding of test relay 478 and through switch 476 to a rectifier 480. Rectifier 480 is oriented so that current flows only when terminal 460 is at a potential higher than that of the scanner. In the present example, since the scanner is at a higher potential than is terminal 460 when the scanner contacts pole points #1, #2 and #3, relay 478 is not energized, However, when the scanner contacts pole point #0, its potential falls to 0 v., which, being less than 4 v., causes test relay 478 to operate a switch 481. In consequence, latch relay 462 is de-energized in order to stop and latch motor 468.

Ganged to the shaft of the scanner of switch 452 is an arm 482, at the free end of which is a roller 484. Roller 484 moves in a path contiguous to ten spaced spring pressed pins 486. Any pin in contact with roller 484 operates through an associated flexible wire 488 into a coding matrix 490. The decoder of FIG. 8 operates in conjunction with three other decoders (FIG. 7) to set up the third, fourth, fifth and sixth orders of a six digit address in matrix 490. In the specific example referred to herein, these four decoders have been indicated as handling the latter "0371" portion of a "460371" address. Matrix 490 provides a two-out-of-six signal output which permits the selection of a given one of the magnetic cards in selected ledger memory 40 (in this example #46) in a manner to be described below.

When the test relays of all four decoders are energized in the foregoing way, switches 492, 494, 496 and 498 are closed and a pulse is sent through lead 500 for the purpose of causing coding matrix to transmit its control signals to ledger memory 40. Thereafter start lead 458 is de-energized and the decoder, after ledger memory 40 has completed its operation, is prepared to receive a new input signal.

*The Ledger Memories—FIGS. 9, 10, 11 and 12*

Generally, each of the ledger memories herein illustrated comprises: a stack of cards or other elements, each of which provides a surface that is coated with a magnetic medium and that is provided with at least one group of peripheral notches; a plurality of selector elements associated with each group of peripheral notches of every card in the stack; and at least one electromagnetic transducer or transfer head predeterminedly positionable with respect to a card selected from the stack. The magnetic medium may be composed, for example, of powdered iron oxide dispersed in a suitable synthetic organic polymer. The transducer is in the form, for example, of a minute iron horseshoe having windings capable of producing magnetic induction in its legs in one direction or the other in accordance wih the current direction. A pulse applied to these windings produces a predetermined magnetic state in a portion of the magnetic medium located across the transducer gap at the instant when the pulse occurs. Conversely, the pulse is generated in these windings by this preset magnetic state when the magnetic medium and the transducer are moved relative to one another.

As illustrated in FIGS. 9, 10, 11 and 12, each ledger memory comprises: a storage system 520 including a stack 522 of cards to be selected at random by means of a pair of opposed banks 524 and 526 of mechanical contacts; a card handling system 528 including an endless belt 530 for advancing a selected card to a holder 532 and including a suction lift 534 for removing the selected card from holder 532 and returning the selected card to stack 522; a bank 536 of transducers (FIG. 12) and a bank of print wheels 537 for reading information from and imparting information to a selected card in holder 532; and a control circuit 538 for rendering the foregoing components sequentially operable.

As shown in FIG. 11, each card 540 of stack 522 is composed of a stiff sheet 542 composed of a non-conducting material, such as cardboard, plastic or the like, and a stratum 544 that incorporates a magnetic material of the above described type. Stratum 544 and the lower portion of sheet 542 generally are substantially coextensive throughout a rectangular region. The upper portion of sheet 544, however, has a plurality of groups of peripheral notches 546, certain of which have extensions 548 projecting from their outer apices. Extending into adjacency with the inner apices of notches 546 are the contacts 550 of tiers 524 and 526 referred to above. Normally, certain of contacts 550 project into the gaps defined by the horizontal edges of notches 546 and extensions 548 for the purpose of preventing a card 540 from dropping from stack 522. Selector contacts 550 individually are reciprocably constrained by suitable guides 552 for movement in directions transverse with respect to their direction of elongation. Contacts 550 normally are urged into their most inward positions by compression springs 554, each of which has one of its ends in association with its associated guide 552. Contacts 552 selectively may be drawn outwardly against the bias of their springs 554 by a pair of banks 556 and 558 of solenoids 559. The reciprocable cores of solenoids 559 are connected mechanically to associated contacts 550. When the appropriate contacts 550 have been withdrawn from their most inward positions, a vibrator 560 operates to ensure that a selected card 540 falls under gravity from stack 522.

As indicated above, card handling system 528, which receives the selected card 540 from stack 522, includes an endless belt 530 for advancing the selected card past a guide roll 564 and a guide deflector 566 into holder 532. The vertical longitudinal edges of holder 532 receive the card, the lower transverse edge of holder 532 supports the card, and the medial portions of holders 532 are cut away to permit access to the card by bank 536 of transducers 572 and bank 537 of print wheels 576, the operation of which will be described below. After being operated upon by transducers 572 and print wheels 576, selected card 540 is returned to stack 522 by parallel linkage 534 at the outer edge of which is a suction cup 580. Cup 580 is adapted to contact and hold the selected card while parallel linkage 534 is directed in an arc by a motor (not shown) back to stack 522. The forward edges of contacts 550 are outwardly curved, as at 583, to facilitate the engagement of these contacts with appropriate notches of the card.

Bank 536 of transducers 572 and bank 537 of print wheels 576 are designed to operate simultaneously on opposite faces of a selected card 540. As shown in part in FIG. 4, each bank is supported within a frame 584, the opposite ends of which are constrained by a pair of vertical guides 586. The vertical position of these banks is determined by a rack and gear system 588. In particular, bank 536 of transducers 572 is mounted upon a rod 590. As shown in FIG. 12, rod 590 is urged by a spring 592 into contact with a cam 594. Rotation of cam 594 about center 596, in response to rotation of a gear 598, causes a rapid reciprocal motion of each of transducers 572 for the purpose of imparting to magnetic stratum 544 a record of the type now to be described.

Control circuits 538 includes a suitable signal input 600, a card selector circuit 602, a transducer and print wheel control circuit 604, a calculator 42 (see FIG. 1), and a card return circuit 610. The operation of the control system is such that initially an input signal from coding matrix 490 (FIG. 8) energizes card selector circuit 602 and an input signal from transmission line 323 (FIG. 6) transmits information to control circuit 604. In response, a selected card 540 is dropped from stack 522 onto endless belt 530 and is directed therefrom into holder 532. When the card has become properly positioned in holder 532, it actuates a microswitch (not shown) in order to energize control circuit 604. Control circuit 604 causes rack and gear system 588 to step bank 536 of transducers 572 down to the last line of magnetic information recorded on the magnetic stratum 544 of the selected card. When the last line is reached, control circuit 604 causes signals from transducers 572 to be transmitted to calculator 606. Calculator 606 combines the information originally received from signal input and output circuit 600 with the information now received from transducers 672 and transmits signals representing the combined information to control circuit 604. In response, control circuit 604 causes the bank of transducers and the bank of print wheels to step down from the last recorded line of magnetic stratum 544 and to impart to the following unrecorded line magnetic representations of the combined information. At the same time, print wheels 576 of bank 537 are caused to print visually the corresponding information on the face of card 540 opposite that carrying stratum 544. Control circuit 538 thus permits an accounting record on stratum 544 to be updated automatically upon receipt of the necessary updating information.

*Verification for Acceptability and Accuracy*

As indicated above in reference to "Director Storage—FIG. 6," each director storage 54 is associated with a watch memory 36 that comprises a reference "list" of cords. Each cord of this list is compared automatically by a suitably programmed comparison circuit with the cord appearing on output lead 323 (FIG. 6) of director storage 54. If the results of the comparison are negative, the transaction is accepted by the remainder of the composite memory 34. If the results of the comparison are positive, either a suitable signal is automatically returned to the ready transmitter or a supervisory operator places a telephone call to the ready transmitter operator for the purpose of issuing instructions. Accordingly, telephone connections between the transaction sites of transmitters 20 and the central sites of watch memories 36 constitute components of the illustrated system.

As indicated in FIG. 1, in any composite memory 34 each ledger memory 40 is associated with a totalizer 46 and the journal memory 38 is associated with a totalizer 44. Each totalizer is a simple adding machine that operates in response to the money amount portion of an incoming signal to add or subtract a mechanical or electrical representation of that money amount to or from a mechanical or electrical representation of the previous total money amount. The totalizers 46 in association with the various ledger memories 40 operate a master totalizer 48 which serves to add or subtract all mechanical or electrical representations imparted by totalizers 46 to or from a mechanical or electrical representation of a previous master total money amount. Journal memory 38 records in sequence all groups of signals appearing on output line 323 of storage 54 (FIG. 6). Accuracy of the system is ensured by a balancing circuit 50 which compares the total represented by totalizer 44 with the total represented by totalizer 48. If the balancing circuit 50 becomes unbalanced, it issues a warning signal which may be checked by an operator.

In order to permit the operator to check the transaction promptly, journal memory 38 includes both a visual printed list and a coded list that may be utilized by machines. In one form as shown in FIG. 11*a*, the coded list is produced by electromechanical transducers of the type shown at 536 (FIG. 9) in response to simultaneous pairs of frequencies from output line 323 (FIG. 6) in magnetic material of the type shown at 544 (FIG. 11). In another form as shown in FIG. 11*b*, the coded list is produced by electro-optical transducers in response to light of various intensities on photographic microfilm.

*Operation and Conclusion*

The operation of the illustrated system now will be explained in reference to a credit transaction involving one of customer transmitters. The charge customer, after having selected desired mechandise, presents the salesperson with a punched tab. The salesperson (FIG. 2) places the punched tab in sensing unit 62 and sets up the transaction on keyboard 60. The salesperson also places a punched tab in a similar sensing unit (not shown) in order to identify himself. Visual indicia of the transaction is set up (FIG. 3) and appears through windows 164 (FIG. 1). The operator actuates ready circuit 96 (FIG. 1). In consequence, cards representing several fields of information are transmitted through filter arrangement 92 (FIG. 4). The ready transmitter 20 (FIG. 2) and a free director storage 54 (FIG. 6) are connected by a transmitter locator 52 (FIG. 5). If the transaction is found acceptable by watch memory 36 (FIG. 1) a source document 172 (FIG. 1) is produced and transmitter 20 is reset. Now also, ledger memory locator 56 (FIG. 7) selects one or more particular ledger memories, in each such memory, in response to decoder 450 (FIG. 8) a card 540 is selected from a stack 522 (FIGS. 9, 10, 11 and 12). A record of the transmitter signal is imparted to magnetic surface 544 (FIG. 11) in the manner described above in reference to FIG. 11*a*. The record also is imparted to a journal memory 38. A comparator 50, in response to an arrangement of totalizers 44, 46 and 48 (FIG. 1) ensures that all entries are accurate. The transaction now is complete and now is entered in all pertinent accounting and operating records.

The present application is a continuation-in-part of patent application Serial No. 630,832, filed December 27, 1956, now abandoned in the name of Edward Rogal for "Information Storage Device."

Since certain changes may be made in the above system without departing from the scope of the invention herein involved, it is intended that all matter contained in the above description or shown in the accompanying drawings shall be interpreted in an illustrative and not in a limiting sense.

What is claimed is:

1. A remotely controlled system comprising a plurality of transmitter means for transmitting transaction signals representing transaction data from a plurality of transaction sites, each of said transmitter means including a signal source, keyboard means for controlling said signal source, coded media sensing means for controlling said signal source, and interlock means for monitoring said keyboard means and said coded media sensing means, said transaction data including address increments and entry increments, a plurality of memory means for selectively receiving records representing entry increments in response to said signals and for combining signals representing said entry increments with signals representing previously recorded entry increments to produce a record of updated entry increments, and director means for transmitting components of said signals representing entry increments from ready transmitters to certain of said memories designated by components of said signals representing address increments, said director means including scanning switch means for establishing joinder with said ready transmitter means, storing switch means for storing a record in response to said signals, and scanning switch means for establishing joinder with all of said certain memories, transmitting means for sending signals representing said record of said storing switch means to all of said certain memories and thereafter for disconnecting said ready transmitter means from the remainder of said system.

2. A remotely controlled system that enters data transmitted from the site of a commercial transaction at the time of its consummation in all pertinent records for review by management in a central office at any time, said system comprising a plurality of transmitters for transmitting signals representing transaction data from a plurality of transaction sites, each of said transmitters includes a signal source, keyboard means for controlling said signal source, tag sensing means for controlling said signal source, and interlock means for monitoring said keyboard means and said tag sensing means, said transaction data including address increments and entry increments, said signals having components representing said address increments and components representing said entry increments, a plurality of memories for selectively receiving records representing accounting multiple entries related to said entry increments in response to components of said signals representative thereof, and a director for transmitting components of said signals representing said entry increments from any given transmitter to a plurality of said memories designated by said components of said signals representing said address increments, said director including scanning switch means for locating said given transmitter, storing switch means when actuated for temporarily storing a record of said address in increments and said memory increments in response to said signals, scanning switch means for locating all of said designated memories when said storing switch means is actuated, transmitting means for sending signals representing said entry increments in said storing switch means to all of said designated memories and thereafter for disconnecting said transmitter from the remainder of said system, said transmitters being situated at a plurality of transaction sites and said memories being located at central sites.

3. A remotely controlled system that enters data transmitted from the site of a commercial transaction at the time of its consummation in all pertinent records for review by management in a central office at any time, said system comprising a plurality of transmitters for transmitting signals representing transaction data from a plurality of transaction sites, said signals having components representing said entry increments, a plurality of composite memories for selectively receiving records representing accounting multiple entries related to said entry increments in response to components of said signals representative thereof, each of said composite memories including a journal memory and a plurality of ledger memories, and a director for transmitting components of said signals representing said entry increments from any given transmitter to any of said ledger memories designated by said components of said signals representing said address increments and to journal memories associated therewith, said director including scanning switch means for locating said given transmitter, storing switch means when actuated for temporarily storing a record of said address increments and said memory increments in response to said signals, scanning switch means for locating all of said designated composite memories when said storing switch means is actuated, transmitting means for sending signals representing said entry increments in said storing switch means to all of said designated composite memories and thereafter for disconnecting said transmitter from the remainder of said system, said transmitters being situated at a plurality of transaction sites and said memories being located at central sites.

4. The remotely controlled system of claim 3 wherein each of said composite memories includes summing means for producing a signal representing a summation of the records of the entry increments in said journal thereof summing means for producing a signal representing a summation of the records of the entry increments in said memory ledgers thereof, and comparing means for balancing said two last mentioned signals.

5. A remotely controlled system that enters data transmitted from the site of a commercial transaction at the time of its consummation in all pertinent records for review by management in a central office at any time, said system comprising a plurality of transmitters for transmitting signals representing transaction data from a plurality of transaction sites, said signals having components representing said address increments and components representing said entry increments, a plurality of composite memories for selectively receiving records representing accounting multiple entries related to said entry increments in response to components of said signals representative thereof, each of said composite memories including a journal memory in the form of a sequential record tape and a plurality of ledger memories, each of said ledger memories including a stack of record elements, each of said record elements being surfaced with magnetic material and being provided with coded media, said coded media being in the form of notches at the edges of said record elements, said magnetic material being capable of undergoing a change in magnetic state in response to an electromagnetic signal, an array of control elements, each of said control elements being operatively associated with all of said notches, selected control elements when energized permitting removal of a selected one of said record elements from said stack and remaining control elements when deenergized preventing removal or remaining record elements from said stack, a reading station, means for transporting said selected one of said record elements to said reading station, transducer means for applying and receiving electromagnetic signals to and from said selected one of said record elements in said reading station, and means for returning said selected one of said record elements from said reading station to said stack, and a director for transmitting components of said signals representing said entry increments from any given transmitter to the array of control elements of any of said ledger memories designated by said components of said signals representing said address increments and to journal memories associated therewith, said director including scanning switch means for locating said given transmitter storing switch means when actuated for temporarily storing a record of said address increments and said memory increments in response to said signals, scanning switch means for locating all of said designated composite memories when said storing switch means is actuated, transmitting means for sending signals representing said entry increments in said storing switch means to all of said designated composite memories and thereafter for disconnecting said transmitter from the remainder of said system, said transmitters being situated at a plurality of transaction sites and said memories being located at central sites.

6. The remotely controlled system of claim 5 wherein each of said composite memories includes summing means for producing a signal representing a summation of the records of the entry increments in said journal thereof, summing means for producing a signal representing a summation of the records of the entry increments in said memory ledgers thereof, and comparing means for balancing said two last mentioned signals.

7. The remotely controlled system of claim 6 wherein each of said control elements mechanically engages notches in all of said cards.

8. The remotely controlled system of claim 7 wherein each of said transmitters includes a slide rack resiliently biased for movement from a deactuated position to one of several actuated positions, means for releasing said slide rack from said deactuated position for movement into said one of several actuated positions, a printing wheel operatively associated with said slide rack for rotation throughout an arc functionally related to the movement of said slide rack, a platen for cooperation with said printing wheel and visual indicia movable with said slide rack for observation through a window.

9. The remotely controlled system of claim 8 wherein a plurality of decoders are associated with said plurality of ledger memories, one each of said decoders being operatively connected to said control elements of one each of said memory ledgers, said one each of said encoders including a driven switch having a plurality of pole points and a scanner and a driven setting unit having a plurality of pole points and a scanner, said scanner of said driven switch and said scanner of said setting unit being synchronized, said pole points of said driven switch having reference signals, means for comparing address increments applied from said director with said reference signals while said scanner of said driven switch operates and for stopping said scanner when selected comparison is made, means for connecting the pole points of said setting unit to said control elements and for actuating selected control elements when said scanner of said setting unit stops.

10. The controlled system as claimed in claim 1 wherein said transaction signals are each in the form of coded frequency combinations.

11. The controlled system as claimed in claim 1 wherein said transmitters are positioned at a plurality of transaction sites adjacent to a source of the transaction data and said plurality of memory means are positioned at a central site.

12. The controlled system as claimed in claim 2 wherein said transaction signals are each in the form of coded frequency combinations.

References Cited in the file of this patent

UNITED STATES PATENTS

| | | |
|---|---|---|
| 1,801,981 | Rogal et al. | Apr. 21, 1931 |
| 2,018,420 | Robinson et al. | Oct. 22, 1935 |
| 2,129,743 | Nelson | Sept. 13, 1938 |
| 2,427,383 | Bryce | Sept. 16, 1947 |
| 2,588,375 | Flint | Mar. 11, 1952 |
| 2,668,877 | Gent et al. | Feb. 9, 1954 |
| 2,814,440 | McWhirter et al. | Nov. 26, 1957 |
| 2,929,556 | Hawkins | Mar. 22, 1960 |
| 3,022,495 | Williamson | Feb. 20, 1962 |
| 3,034,110 | Poch | May 8, 1962 |

FOREIGN PATENTS

| | | |
|---|---|---|
| 545,238 | Belgium | Feb. 29, 1956 |

US003121159A

REEXAMINATION CERTIFICATE (1840th)

United States Patent [19]

Rogal

[11] B1 3,121,159

[45] Certificate Issued Nov. 10, 1992

[54] CENTRAL OFFICE MASSIVE MEMORY RECORDING SYSTEM

[76] Inventor: Edward Rogal, North Sciuate, Mass.

Reexamination Requests:
No. 90/000,365, May 2, 1983
No. 90/000,499, Feb. 10, 1984

Reexamination Certificate for:

| | |
|---|---|
| Patent No.: | **3,121,159** |
| Issued: | **Feb. 11, 1964** |
| Appl. No.: | **784,913** |
| Filed: | **Jan. 5, 1959** |

[51] Int. Cl.[5] ........ G06F 15/21; G07G 1/12
[52] U.S. Cl. ........ 395/800; 235/6
[58] Field of Search ... 364/200 MS File, 900 MS File, 364/406, 401, 403; 340/825.1, 825.29; 360/72.1, 72.2; 235/385, 379, 378; 178/3

[56] References Cited

U.S. PATENT DOCUMENTS

| | | | |
|---|---|---|---|
| 1,005,555 | 10/1911 | Kettering | 235/2 |
| 1,209,735 | 12/1916 | Lorimer . | |
| 2,129,743 | 9/1938 | Nelson | 178/3 |
| 2,432,324 | 12/1947 | May | 340/815.04 |
| 2,446,037 | 7/1948 | Ammann et al. | 340/825.1 |
| 2,513,112 | 6/1950 | Sheperd | 340/825.22 |
| 2,528,394 | 10/1950 | Sharpless et al. | 377/13 |
| 2,535,218 | 12/1950 | Marble | 364/406 |
| 2,549,071 | 4/1951 | Dusek et al. | 360/72.1 |
| 2,564,410 | 8/1951 | Schmidt | 177/353 |
| 2,565,511 | 8/1951 | McWhirter et al. | 340/825.29 |
| 2,568,756 | 9/1951 | McWhirter et al. | 340/825.29 |
| 2,587,532 | 2/1952 | Schmidt | 360/72.2 |
| 2,594,960 | 4/1952 | May | 364/401 |
| 2,611,813 | 9/1952 | Sharpless et al. | 360/97 |
| 2,668,009 | 2/1954 | Schmidt | 235/60.27 |
| 2,737,342 | 3/1956 | Nelson | 364/403 |
| 2,879,000 | 3/1959 | MacDonald et al. . | |
| 2,883,106 | 4/1959 | Cornwell et al. | 235/385 |
| 2,910,238 | 10/1959 | Miles et al. | 364/401 |
| 2,995,729 | 8/1961 | Steele | 364/200 |
| 3,018,042 | 1/1962 | Nettleton | 235/435 |
| 3,029,414 | 4/1962 | Schrimpf | 364/200 |
| 3,071,753 | 1/1963 | Fritze et al. | 364/403 |
| 3,089,124 | 5/1963 | Hagen et al. | 360/78 |
| 3,134,016 | 5/1964 | Connolly et al. | 364/403 |
| 3,304,416 | 2/1967 | Wolf | 377/13 |

FOREIGN PATENT DOCUMENTS 270,044 5/1927 United Kingdom .

OTHER PUBLICATIONS

Jeming, "Retailing With Electronics", *Stores*, (1950).
Baer, Rettig and Cohen, "On-Line Sales Recording System", Proc. E. J. Comp. Conf. (1958).
Edison et al., *Electronics*—New Horizon In Retailing (1953).
Fendrich, "Bank Input to EDP: A Bank Accounting System," *AMA Management Report No. 6* (1958).
Gaffney and Levine, "Design Techniques for Multiple Interconnected On Line Data Processor", *Proc. E.J.C.C.* (1957).

*Primary Examiner*—David Y. Eng

EXEMPLARY CLAIM

1. A remotely controlled system comprising a plurality of transmitter means for transmitting transaction signals representing transaction data from a plurality of transaction sites, each of said transmitter means including a signal source, keyboard means for controlling said signal source, coded media sensing means for controlling said signal source, and interlock means for monitoring said keyboard means and said coded media sensing means, said transaction data including address increments and entry increments, a plurality of memory means for selectively receiving records representing entry increments in response to said signals and for combining signals representing said entry increments with signals representing previously recorded entry increments to produce a record of updated entry increments, and director means for transmitting components of said signals representing entry increments, from ready transmitters to certain of said memories designated by components of said signal representing address increments, said director means including scanning switch means for establishing joinder with said ready transmitter means, storing switch means for storing a record in response to said signals, and scanning switch means for establishing joinder with all of said certain memories, transmitting means for sending signals representing said record of said storing switch means to all of said certain memories and thereafter for disconnecting said ready transmitter means from the remainder of said system.

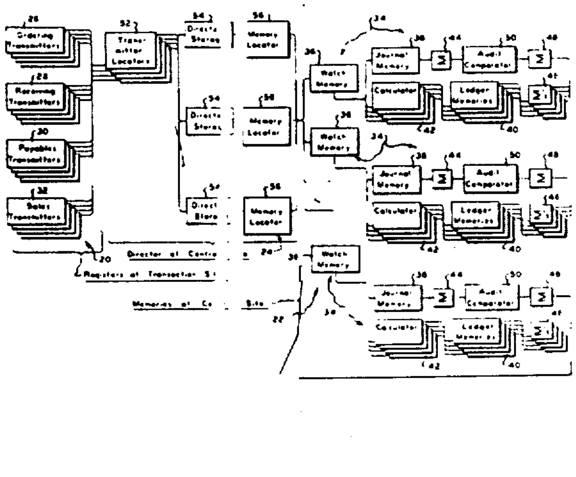

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *